United States Patent [19]

Hula, Jr.

[11] Patent Number: 4,506,741
[45] Date of Patent: Mar. 26, 1985

[54] LEVEE GATE CUTTER

[76] Inventor: Melvin F. Hula, Jr., Rte. 1, Box 84, De Valls Bluff, Ark. 72041

[21] Appl. No.: 482,822

[22] Filed: Apr. 7, 1983

[51] Int. Cl.³ ............................. A01B 3/76; A01B 5/00
[52] U.S. Cl. ................................. 172/445.1; 172/815; 172/448; 405/36
[58] Field of Search ............... 172/445.1, 445.2, 815, 172/787, 817, 448, 474, 199

[56] References Cited

U.S. PATENT DOCUMENTS

| | | | |
|---|---|---|---|
| 2,051,234 | 8/1936 | Wiese | 172/745 |
| 2,428,857 | 10/1947 | Smith | 172/445.1 |
| 2,512,114 | 6/1950 | Robinson | 172/445.2 |
| 2,566,562 | 9/1951 | Hale | 172/448 |
| 2,888,996 | 6/1959 | Ralston | 172/901 |
| 3,145,489 | 8/1964 | Smith | 172/445.1 |
| 3,234,669 | 2/1966 | Kachnik | 172/448 |
| 3,336,685 | 8/1967 | Keller | 172/445.1 |
| 3,704,754 | 12/1972 | Layton | 172/815 |
| 4,320,988 | 3/1982 | Seal | 172/445.1 |

FOREIGN PATENT DOCUMENTS 164277 9/1954 Australia ..................... 172/445.1

Primary Examiner—Richard J. Johnson
Attorney, Agent, or Firm—Stephen D. Carver

[57] ABSTRACT

A farm implement adapted to install plastic lined irrigation gates in rice levees and the like to aid in flood control. The machine comprises an elongated, rigid frame comprised of a trio of rigid struts. The rear of the frame terminates in a rigid scoop of concave cross section having a width somewhat wider than the frame. An elongated dipper blade, also of concave cross section, is pivotally coupled to the frame in spaced-apart, generally parallel relation with respect to the scoop. The dipper blade may be removed by hydraulic means between dirt cupping, dirt releasing and ground engaging positions whereby to dig a suitable contoured trench adjacent the levee after a hole has been cut by the scoop. A plastic sheet is then placed over the hole and trench, and dirt from the dipper blade is deposited upon the plastic sheet to secure same. Prior to cutting another gate, the dipper blade is drawn over the plastic sheet and the dirt deposited thereon to properly contour the gate for subsequent flood control.

2 Claims, 11 Drawing Figures

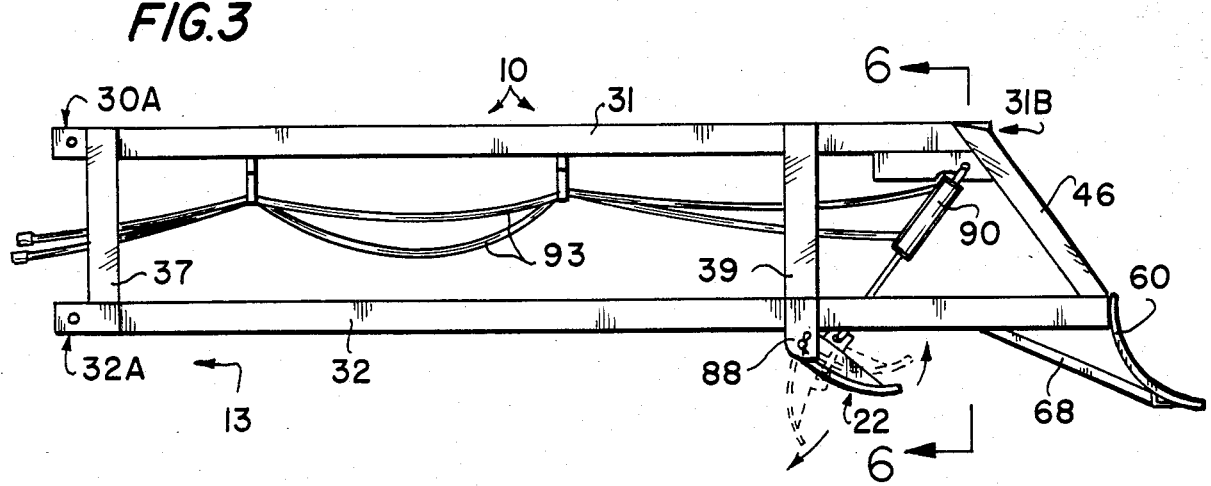
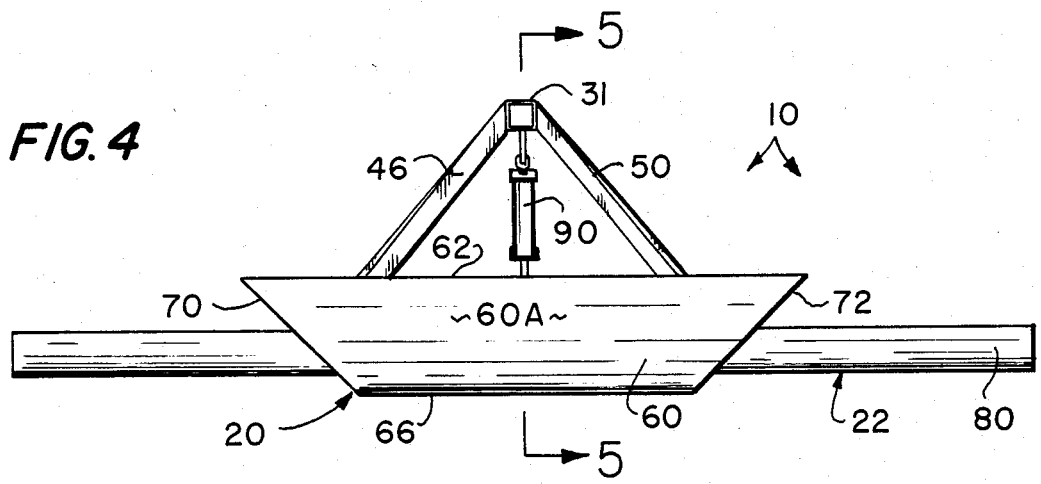
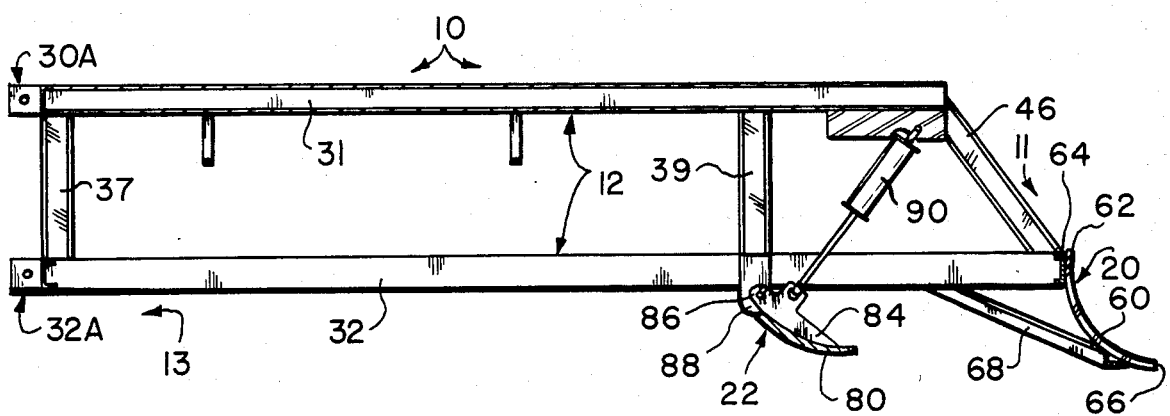

LEVEE GATE CUTTER

BACKGROUND OF THE INVENTION

The present invention relates generally to implements used for rice farming. More particularly, the present invention relates to apparatus for properly cutting and forming levee gates for flood control.

As will be appreciated by those skilled in the rice farming art, approximately six months after harvest of the previous years crop, the rice field is first prepared with a disk or harrow. In Arkansas farms, initial field preparation usually occurs in April of the year. After the fields are first prepared in this manner, the next step may be to plant the rice crop with, for example, a conventional drill. Afterwards, the land is surveyed to set up approximately three inch differentials between alternate holding ponds. The contours are established with a heavy plow or other equipment which establishes levees between adjacent flood ponds. Some farmers prefer to survey and furrow the ground prior to planting.

Usually the levees are started at the highest altitude in the field, and different flood ponds are established sequentially at lower elevations. Different flood ponds communicate with each other through a plurality of flood gates which have hitherto been cut with cumbersome mechanical contrivances, or, as is more often the case, the gates may be cut by hand. Thus when the highest altitude flood ponds are flooded and filled, water will drain through their communicating gates into the next lower flood plane until all of the successive ponds are properly flooded to provide a desirable growing environment for the rice crop.

In the prior art a variety of broadly relevant art is known. Soil may be leveled and treated by the apparatus of Pat. Nos. 3,266,181 and 2,964,864. Flow channels or gates may be established mechanically with the apparatus of U.S. Pat. No. 3,834,466. Levees may be initially established with the machines of U.S. Pat. Nos. 4,073,245; 2,644,252 and 2,311,337. U.S. Pat. No. 1,184,329 discloses a now obsolete irrigating furrow forming machine which, through the process described therein is capable of forming irrigation channels in existing levees. Less relevant art is seen in Pat. No. 3,199,608.

The relatively high volume flow of water through levee cross channels in the flooding process often destroys the channel or gate through the process of erosion. This can result in unwanted widening of the channel, and uncontrolled flooding rates resulting from channel deformation. Accordingly, it is usually the practice to line irrigation gates with a form of plastic sheet, to form a non-eroding bottom in the channel. In most farm operations of which I am aware, the cross channels or levee gates must be cut by hand using conventional implements such as a shovel. This is necessary because some form of "anchor" must be made to weight the plastic in place so it will not be moved out of the cross channel in response to rushing water. I have proposed a unique mechanical system for automatically cutting the necessary cross channels or gates, to facilitate rapid permanent installation of the plastic liner which is required for reliable levee flooding control.

SUMMARY OF THE INVENTION

The present invention comprises an irrigation gate cutting machine adapted to install plastic lined gates in conventional rice farming levees.

Preferably my machine comprises a boom-like, rigid frame comprised of a trio of elongated, rigid members which terminate in a remote rear end. The two lower members are generally parallel, and occupy a plane forming a bottom of the frame. A rigid scoop is fixedly secured at the rear of the frame, and it is of generally concave cross section. The concave region of the scoop projects outwardly away from the rear of the frame, and enables the scoop to function somewhat as a plow to cut a portion of the contoured levee gate when the tractor or other vehicle upon which the frame is coupled is moved rearwardly.

An elongated, pivotal dipper blade is coupled to the frame in spaced-apart, generally parallel relation with respect to the scoop. The dipper blade is also a generally concave cross section, but the dipper blade may be moved between generally vertical and generally horizontal positions. The dipper blade is of a length greater than the width of the frame, and greater than the length of the scoop. Through a conventional hydraulic cylinder, which is preferably employed to manipulate the dipper blade, the dipper is capable of digging a trench immediately adjacent the levee hole cut by the scoop which is generally parallel to the levee. Once the trench is cut, the dipper blade is moved to a horizontal position which retains the earth cut from the trench, and the frame is lifted over the levee. Once the trench and the levee hole are cut in this manner, the farmer may then place a conventional plastic sheet within the hole to line the irrigation channel.

When the plastic sheet is installed, the dipper blade may be released to dump dirt back into the trench, thereby weighting and thus securing the plastic sheet in place. When then moved to a generally horizontal orientation, the machine is dragged over the contoured gate to profile the gate ends, and to thoroughly coat the plastic sheet with dirt. Additionally, this forms a neatly profiled levee gate which resists erosion caused by flowing water.

Thus a broad object of my invention is to provide a mechanical accessory for rice farming which enables plastic lined levee gates to be quickly and reliably installed in conventional levees.

A more basic object of my invention is to eliminate manual labor otherwise required during the installation of plastic lined levee gates.

Similarly, it is an object of this invention to greatly speed up the process of gate installation in rice farming.

Yet another object of the present invention is to provide a mechanical system for quickly and reliably installing levee gates of uniform dimension.

Yet another object of my invention is to provide a levee gate cutting machine of the character described which is adapted to be employed in conjunction with a conventional tractor three point hitch.

Yet another object of the invention is to provide a mechanical system for quickly installing plastic liners in levee gates which provides for the weighting or locking of the plastic to prevent its withdrawal or dislodging in response to water pressure.

A more basic object of the present invention is to provide a system for gate installation for uniform flood control in rice farming.

Yet another object of the present invention is to provide a gate installing device of the character described which may be remotely operated and controlled by a single tractor driver.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is a side elevational view, with moved positions illustrated in dashed lines;

FIG. 4 is a rear elevational view thereof;

FIG. 5 is a longitudinal sectional view taken generally along line 5—5 of FIG. 4;

DETAILED DESCRIPTION OF THE DRAWINGS

Figure 1:
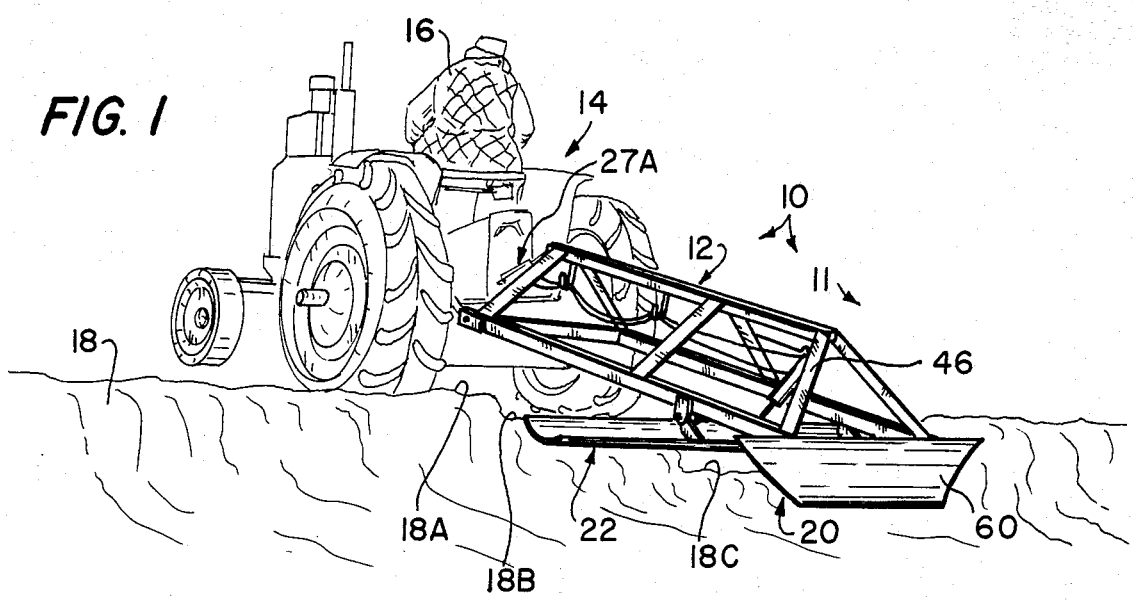
FIG. 1 is a pictorial view illustrating use of my levee gate cutting machine mounted upon a conventional tractor, shown installing a gate.

With initial reference to FIG. 1, a preferred embodiment of my irrigation gate cutting machine has been generally designated by the reference numeral 10. Machine 10 includes an elongated boom-like frame, generally designated by the reference numeral 12, which is adapted to be pivotally coupled through a conventional three point hitch to the rear of a conventional tractor 14. Farmer 16 is illustrated cutting a gate through a conventional rice levee 18. Cutting operation of the machine is accomplished through the cooperative efforts of a rigid, fixedly mounted rear scoop assembly, generally designated by the reference numeral 20, and a parallel, spaced-apart dipper blade assembly, generally designated by the reference numeral 22.

Figure 6:
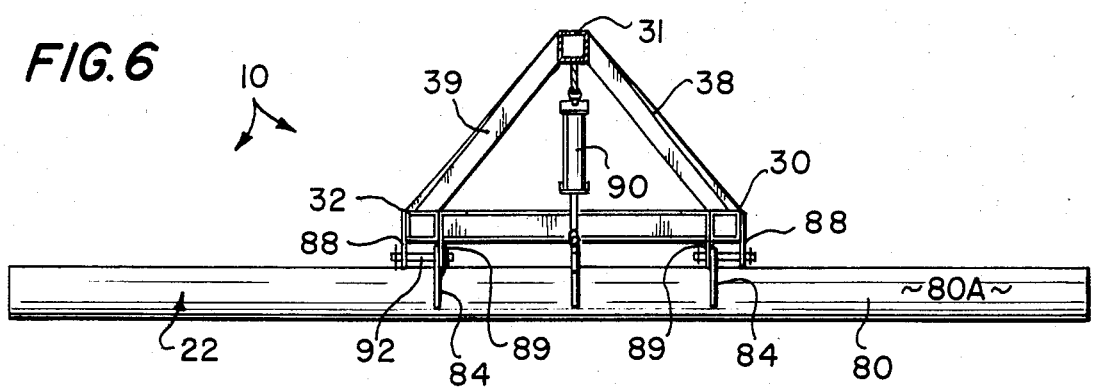
FIG. 6 is a sectional view taken generally along line 6—6 of FIG. 3.
Figure 7:
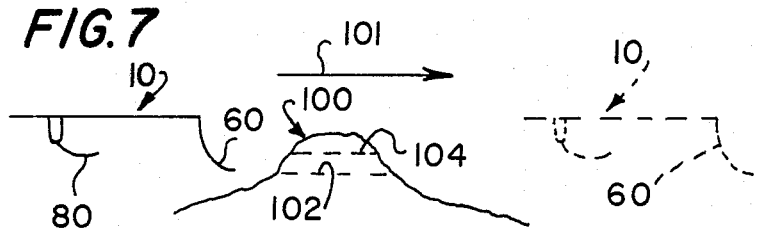
FIG. 7 is a diagrammatic view illustrating the process of gate cutting with moved positions illustrated in dashed lines.

With additional reference now to FIGS. 2-6, frame 12 includes a trio of elongated, rigid, parallel, spaced-apart struts 30, 31, 32. These struts are arranged in a generally triangular configuration and are formed from channel steel (FIG. 6). Struts 30, 32 occupy opposite bottom sides of the frame, and are generally coplanar. Strut 31 is elevated above the lower bottom of the frame formed by struts 30 and 32, and is of a shorter length than either strut 30, or 32. Struts 30 and 31 are secured together by a pair of spaced-apart braces 36 and 38. Struts 31 and 32 are similarly secured by struts 37, 39. Each of the frame struts 30, 31, 32 terminates at the front (generally designated by the reference numeral 13) of the frame, in suitable couplings respectively designated 30A, 31A, and 32A, for attachment to the three point hitch of tractor 14 in a conventional manner.

Figure 2:
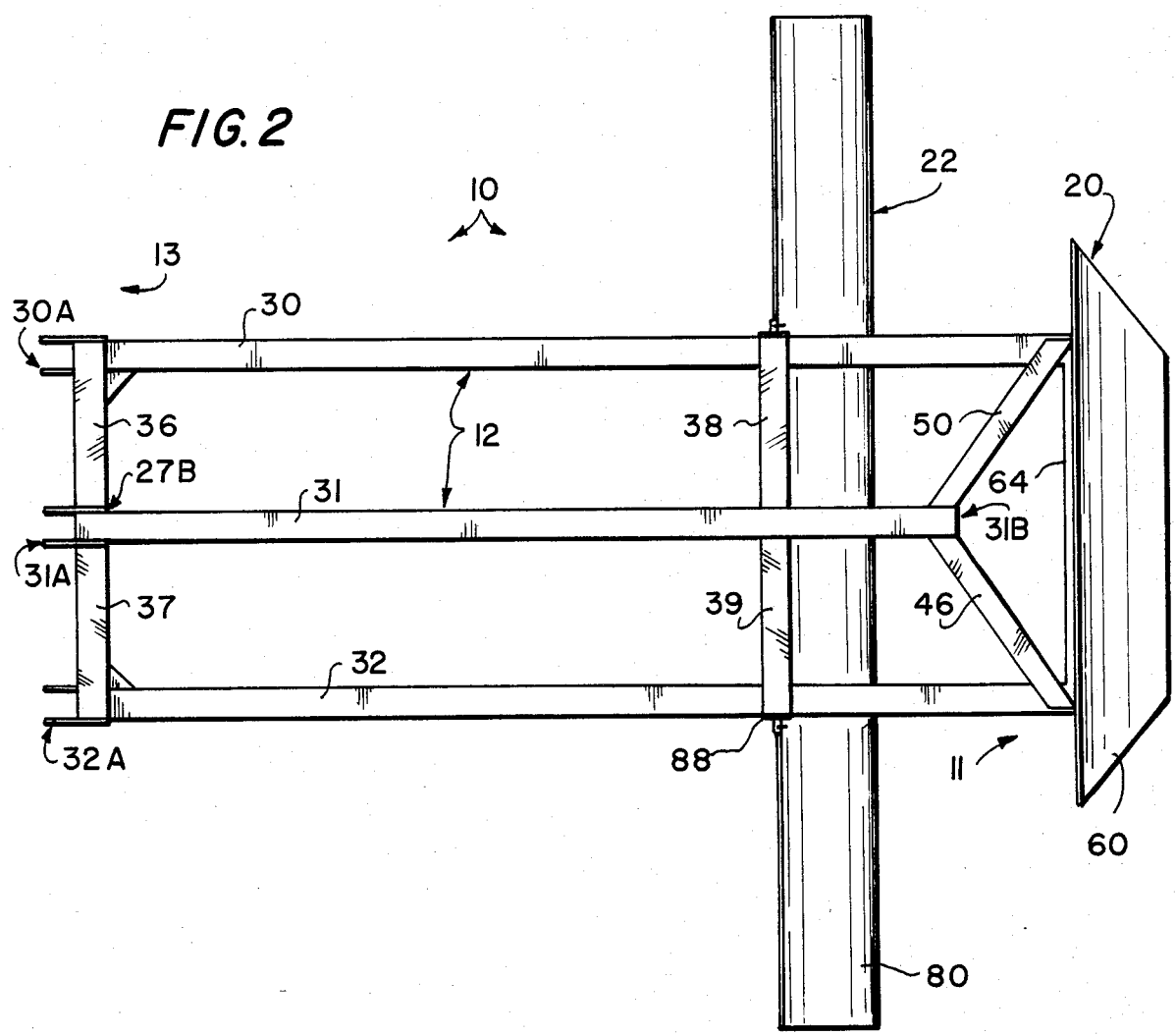
FIG. 2 is an enlarged top plan view of the preferred embodiment of my levee gate machine.

As best viewed in FIGS. 2 and 3, the upper frame strut 31 is of a length somewhat shorter than the lower struts 30 or 32. The load bearing rear end of frame strut 31, generally designated by the reference numeral 31B, is strengthened by oblique rear reinforcements 46 and 50. The entire frame may be elevated by the hydraulically operated link 27A which is part of the three point hitch assembly of tractor 14, which terminates in couplings 30A, 31A, and 32A previously discussed. Frame struts 30, 32 preferably occupy a plane and form the bottom of the frame 12.

The frame rear end is generally designated by the reference numeral 11. The rigid scoop assembly 20 is preferably fixedly secured to machine 10 at the rear frame end 11. Scoop assembly 20 includes an elongated, rigid metallic blade 60 of generally concave cross section (FIGS. 3, 5). The concave face 60A of blade 60 projects away from and outwardly with respect to frame rear end 11. The upper portion 62 of blade 60 is welded to a transverse frame end 64, which rigidly extends horizontally between and coplanar with frame struts 30 and 32. The lowermost portion 66 of blade 60 is braced with a pair of oblique channel members 68. As best viewed in FIG. 4, opposite sides 70, 72 of blade 60 are angularly configured. In other words, orthographic projection of blade 60 upon a plane reveals an appearance in the form of an inverted frustrum of a cone. Thus the width of blade bottom 66 is narrower than the width of blade top 62. Moreover, it will be apparent from FIG. 4 that blade 60 is of a width in excess of the width of frame 12.

The dipper blade assembly 22 includes an elongated, rigid blade 80 which, like scoop blade 60 previously described, is of generally concave cross section. Concave face 80A projects rearwardly towards the rear 11 of the frame. Blade 80 is pivotally secured relative to frame 12 by a pair of spaced-apart actuator pivots 84 which include portions 86, pivotally secured to downwardly projecting pivot tabs 88, 89 (FIG. 6) by conventional pivot pins 92. Thus, in response to actuation of cylinder 90 through conventional hydraulic hoses 93, it will be apparent that the dipper blade 80 may be moved between the extreme positions illustrated generally in dashed lines in FIG. 3. Motion of the dipper blade is extremely important in producing a proper trench, as will hereinafter be described.

Operation of the device is best understood with reference to FIGS. 7-11. As the farmer backs machine 10 over an uncut levee 100 in the direction of arrow 101, the blade 60 will cut a hole to elevation 102, and the following dipper blade 80 will trim the levee by creating a wider but shallower cut of elevation 104. This will occur as machine 10 is moved across the levee to initially cut open a hole profiled substantially as illustrated.

Figure 8:
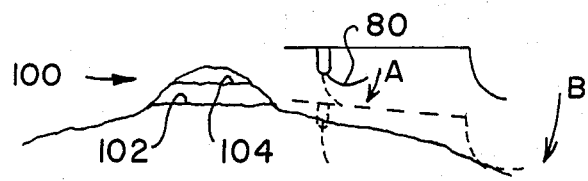
FIG. 8 is a view similar to FIG. 7, but illustrating advanced positions of the operative portions of my machine.
Figure 9:
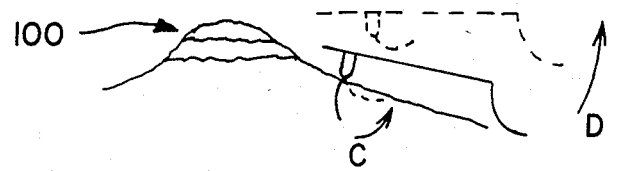
FIG. 9 is a view similar to FIG. 8.
Figure 10:
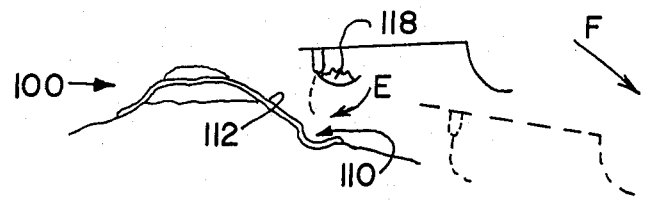
FIG. 10 is a view similar to FIGS. 7-9, but illustrating the dipper blade in a dirt cupping position; and, FIG. 11 is a view similar to FIGS. 7-10 but illustrating the operative parts of my machine in a withdrawing position.

When machine 10 is moved into the position illustrated in solid lines in FIG. 8, dipper blade 80 will be forced by hydraulic cylinder 90 into a substantially vertical position, and the frame will be lowered into the position illustrated in dashed lines in FIG. 8, thus dropping the machine 10. With reference now to FIG. 9, it will be apparent that once dipper blade 80 is appropriately positioned to dig a trench, subsequent manipulation and remanipulation by its control cylinder 90 will dig a trench adjacent the levee 100, generally designated by the reference numeral 110. Thus the conventional plastic sheet 112 may be thereafter manually positioned in the contoured hole which has been cut, and a portion of the sheet will overlay trench 110. Meanwhile, of course, dirt 118 will have been trapped in the dipper blade 80.

Figure 11:
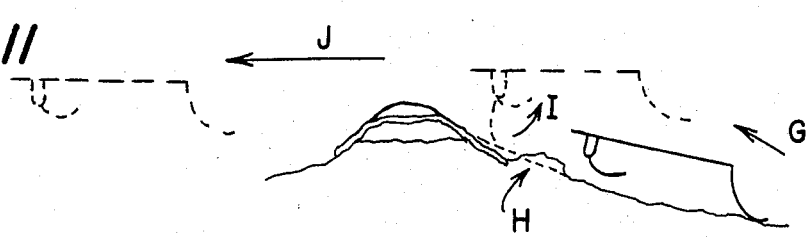

As illustrated diagrammatically in FIG. 11, the dipper blade 80 may then be dropped to fill trench 110 with dirt, thereby weighting and locking the sheet 112 in proper position. With the dipper place returned to a horizontal position and the frame dropped slightly the machine may be gently dragged over the resultant structured hole to lightly cover and secure the sheet 112 with a covering of dirt.

Importantly, this will provide a levee gate including a captured plastic lining 112, which will be of a dual depth. Attention is directed to FIG. 1, wherein the elevation of uncut levee 18 has been designated broadly by the reference numeral 18A. That portion of the gate cut by the dipper blade 80 has been designated by the reference numeral 18B. Similarly that portion of the gate cut by scoop means 20 has been designated by the reference numeral 18C. Moreover, this region 18C is configured in the form of an inverted frustrum of a cone similar to the shape of the blade 60. Through the apparatus disclosed, the particularly contoured and shaped, plastic lined gate illustrated in FIGS. 1 and 8–11 will be formed.

This uniquely configured mechanically made gate may be duplicated dozens of times by the farmer without manual digging. Once a desired number of gates have been installed, proper flooding of the entire field(s) may be completed.

From the foregoing, it will be seen that this invention is one well adapted to obtain all of the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A machine for installing plastic lined irrigation gates in levees, said machine comprising:
    elongated, rigid, frame means adapted to be coupled to a tractor or other tow vehicle, said frame means having a length and a uniform width and terminating in a rear end, said frame means capable of being moved between ground engaging and levee clearing positions, said frame means comprising:
        a trio of elongated, rigid, parallel spaced-apart struts, the first and second of said struts occupying a plane and forming a bottom of said frame means; and,
        the third strut being centered above said first and second struts forming a top of said frame means, a rear end of said third strut terminating short of the rear ends of the first and second struts;
    rigid scoop means fixedly pivotally coupled to said frame means rear end for first opening a hole in a levee when said machine is moved therethrough, the scoop means being of concave cross section; the concavity facing outwardly away from the frame means rear end, and said scoop means having a length greater than said frame means width and being substantially centered with respect to said frame means;
    elongated dipper blade means coupled to said frame means in spaced-apart, generally parallel relation with respect to said scoop means for forming a trench adjacent said levee hole generally parallel to said levee, said dipper blade means being of concave cross section and having a length greater than the length of said scoop means;
    hydraulic cylinder means for moving said dipper blade means between dirt cupping and dirt release positions whereby dust removed from said trench may be redeposited upon plastic lining subsequently installed in said trench and hole, said cylinder means coupled to the rear of said third frame means strut and extending into pivotal engagement with said dipper blade means.

2. A device for installing plastic lined irrigation gates in levees, said device comprising:
    elongated, rigid, frame means having three-point hitch means at one end adapted to be coupled to a tractor or other tow vehicle, said frame means having a length, a width and a rear end, said frame means capable of assuming ground engaging and levee clearing positions and comprising a plurality of elongated, rigid, parallel spaced apart struts;
    rigid scoop means operatively coupled to said frame means rear end for first opening a hole in a levee when said machine is moved therethrough, the scoop means being of concave cross section; the concavity facing outwardly away from the frame means rear end, and said scoop means having a length greater than said frame means width and being substantially centered with respect to said frame means;
    elongated dipper blade means pivotally coupled to said frame means in spaced-apart, generally parallel relation with respect to said scoop means for forming a trench adjacent said levee hole generally parallel to said levee, said dipper blade means being of concave cross section and having a length greater than the length of said scoop means; and being centered with respect to said frame means;
    means for moving said dipper blade means between dirt cupping and dirt release positions whereby dirt removed from said trench may be redeposited upon plastic lining subsequently installed in said trench and hole, said last mentioned means coupled to the rear of said frame means and operationally extending between said frame means said dipper blade means.

* * * * *